(12) United States Patent
Schwartz et al.

(10) Patent No.: US 8,209,221 B2
(45) Date of Patent: Jun. 26, 2012

(54) METHOD AND APPARATUS FOR PLACEMENT OF A PRODUCT OR SERVICE IN A GAMING SYSTEM

(75) Inventors: Richard T. Schwartz, Chicago, IL (US); Jeffrey Lichtman, Highland Park, IL (US)

(73) Assignee: WMS Gaming Inc., Waukegan, IL (US)

( * ) Notice: Subject to any disclaimer, the term of this patent is extended or adjusted under 35 U.S.C. 154(b) by 1939 days.

(21) Appl. No.: 11/176,794

(22) Filed: Jul. 7, 2005

(65) Prior Publication Data

US 2006/0009284 A1      Jan. 12, 2006

Related U.S. Application Data

(60) Provisional application No. 60/585,907, filed on Jul. 7, 2004.

(51) Int. Cl.
*G06Q 30/00* (2012.01)
*A63F 13/00* (2006.01)
*A63F 9/24* (2006.01)
*G06F 17/00* (2006.01)
*G06F 19/00* (2011.01)

(52) U.S. Cl. ........................................ 705/14.4; 463/30

(58) Field of Classification Search .................... 463/20, 463/16; 273/143
See application file for complete search history.

(56) References Cited

U.S. PATENT DOCUMENTS

| | | | |
|---|---|---|---|
| 5,941,772 A | 8/1999 | Paige | |
| 6,302,790 B1 * | 10/2001 | Brossard | 463/20 |
| 6,390,917 B1 * | 5/2002 | Walker et al. | 463/20 |
| 6,523,824 B1 * | 2/2003 | Colapinto et al. | 273/143 R |
| 2003/0153381 A1 * | 8/2003 | Slattery | 463/16 |

* cited by examiner

*Primary Examiner* — Afaf Ahmed
(74) *Attorney, Agent, or Firm* — Schwegman, Lundberg & Woessner, P.A.

(57) ABSTRACT

A method and system for producing a gaming system that is based on a game design. The game design includes a plurality of design elements with at least some of the design elements are generic elements of a particular type. The method and system offer to place a product or service on a gaming system on which the game design is used, where the offer is to use a branded element in place of a selected one of the generic elements of the game design. The method and system also dynamically place a branded element in the game in place of the selected one of the genetic elements during operation of the gaming system, where the branded element is of the same type as the generic element. The method and system also compensate a producer of the gaming system for the placement of the branded element in the gaming system.

26 Claims, 5 Drawing Sheets

METHOD AND APPARATUS FOR PLACEMENT OF A PRODUCT OR SERVICE IN A GAMING SYSTEM

RELATED APPLICATION

This application claims priority under 35 U.S.C. 119(e) from U.S. Provisional Application Ser. No. 60/585,907 filed Jul. 7, 2004, which application is incorporated herein by reference.

TECHNICAL FIELD

Embodiments of the invention relate to gaming machines and more particularly to methods and apparatus for advertising using gaming machines.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2005, WMS Gaming, Inc. All Rights Reserved.

BACKGROUND

According to the Harrah's 2003 Survey and the American Gaming Association's most recent survey, more than a quarter of Americans age 21 and older gambled at a casino in 2002 (26% or 51.2 million adults). Gamblers took about 300 million trips to casinos and, on average, visited a casino about once every two months. The Harrah's 2003 Survey also finds that casino gambling appeals most to Americans ages 51 to 65 with the percentage of participation being the following:

| | |
|---|---|
| Ages 21-35 years old | 25% |
| 36-50 | 25% |
| 51-65 | 30% |
| 66 years old and above | 27% |

Legalized gambling is a $54 billion industry overall. Slot machines and electronic gaming devices are the most popular casino games among Americans with 74% stating this preference for their gambling entertainment. Women, by an overwhelming margin (81% to 67%) prefer to play slot machines and electronic gaming devices compared to men. In addition, the income of casino players is more than 20% higher ($50,716 versus $42,228) than the income of the average American.

Accordingly, casinos in general and slot machines in particular provide an attractive opportunity as an advertising medium to these demographics. U.S. Pat. No. 6,523,824, to Colapinto, for instance, describes a method to use slot machines for advertising wherein a casino sells advertising space on slot machines to businesses. In particular, Colapinto describes that advertising icons will be placed appropriately on the reels of the slot machine, after which the newly programmed machines can be operated. According to Colapinto, such an arrangement may be encompassed in an agreement as follows: "The agreement which must be reached will include a price, if any, to be paid by a business to have icons of the business and its products or services placed on the slot machine reels, the percentage of payout, and other details as will be known to those skilled in the art." Colapinto also indicates such advertising may be placed without an agreement between two organizations: "A supermarket, for example, might operate our system utilizing some, or all, of its products as the basis for pay out coupons or tokens."

U.S. Pat. No. 5,941,772 to Paige describes another method and apparatus to exploit the activity of slot machine wagering for commercial advertising purposes and/or for dispensing of advertising, commercial or promotional merchandise. Paige describes a slot machine in which the jackpot and/or pay off symbols are replaced with an advertiser's product identity or logo. While the casino payoffs remain unchanged, the players look for a match of product logos instead of the familiar "7-7-7" or bells or cherries. In this manner, the very act of winning is linked to the product being advertised. Additional incentives for the player, as well as the casino, are related to this advertising method. The described method also utilizes a system for tying use of the invention with accumulation of points redeemable for merchandise.

In addition, it is also known that casino game manufacturers will license the right to use a well-known or famous entertainment product, character, game, movie or television show as the basis for a slot machine game design. In these instances, casino game manufacturers seek to use the popularity of these well-known game designs to draw players to the casino games in which they are used. Accordingly game manufacturers pay the holder of the rights to these products or entertainment media for the right to use them.

DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

In the following detailed description of exemplary embodiments of the invention, reference is made to the accompanying drawings (where like numbers represent like elements), which form a part hereof, and in which is shown, by way of illustration, specific exemplary embodiments in which the invention may be practiced. These embodiments are described in sufficient detail to enable those skilled in the art to practice the invention. It is to be understood that other embodiments may be utilized and logical, mechanical, electrical or other changes may be made without departing from the scope of the inventive subject matter described herein.

As discussed in the background section hereof, and as recognized by others, casino gambling machines, typically referred to as slot machines, provide an attractive advertising opportunity. Some known art in this area, as described above, calls for an advertiser to pay or provide other consideration or compensation to a casino for the right to advertise on a casino game, for example by including a product logo as a symbol on a slot machine reel. In addition, it is known for slot machine manufacturers to pay owners of popular games or entertainment media for the right to use elements of these games or media as the game design for a casino slot machine.

As used herein, the term "offering" means a product or a service that is offered for purchase, lease or use by a consumer, business or other entity, such as consumer or commercial products or services. As used herein, the term "game design" means a composition of "design elements" that collectively produce a game and the resulting gaming experience. Design elements may include, but are not limited to, thematic, plot, character, behavioral, object, visual, audio and tactile elements.

A game design includes a game play component, which provides a wagering game for a gambler to play. Some such wagering games allow for the gambler to place a bet and initiate a game cycle in which an outcome is determined by at least some influence of random chance. Other game design components include artwork or audiovisual displays that can be used on or above a housing or cabinet for a game, or be used in conjunction with the game, such as the display of a progressive jackpot meter. A game design may also include a live play component that is presented during actual play of the game, and an attract mode component which is used to demonstrate, excite and attract players to the game.

A thematic element of a game design may include a general theme for an entire game, or for a sub-part of the game. For instance, a popular television show may be chosen as the theme of a casino game. Or, the theme of a gaming system may be a popular arcade video game, or board game. A plot element may include a plot line that runs through all or part of the game design, such as a character on a hunt for lost treasure, where the character confronts one or more challenges that must be overcome to find the treasure. A character element may include one or more characters that are used in the game design, such as a character modeled after an animal, with the character having one or more identifiable attributes such as the way the character looks, acts, or speaks. A behavioral element may define a particular type of action or behavior that the game exhibits or an element that the game exhibits. An object element may comprise a particular object that appears in a game, such as a vegetable, fruit, or gem that is used in the game. The foregoing list is not meant to be exhaustive, and many other game design elements are possible.

A game design further comprises, at one level, a work of authorship (often with inventive attributes). The party, or parties, that control, by ownership or licensing, the rights to the game design, may authorize or effect the modification of the work, for example, by changing the appearance or attributes of a design element. Unless such changes or modifications are authorized, it is generally impermissible for an owner of a copy of the work to make them.

According to one example embodiment, a game design includes play sequence, mode of operation, or story line. A game design may also be part of an attract mode sequence that demonstrates some or all of the play sequence or script. For instance, a game design may comprise a cartoon or human character acting or speaking in a certain way it may include a character eating or drinking a food product such as fruit, candy bar, or soda during a game sequence. Or, a game design may include the display of a food product on the reels of a slot machine, such as apples, bananas, oranges or cherries, or it may include the display of types of canned foods such as beans, fruit, vegetables or other such foods. Alternatively, the game design may include the depiction of a service, such as a character eating at a particular restaurant, delivering a package, or rendering or offering other services. In such cases, an offering is an element in the game or a segment of the game. In this situation, the particular brand of offering is not critical or may not even important to game play. Thus, the game can be played using generic offering elements without diminishing the attractiveness of the game.

As used herein, the term "generic element" means an element of a game design which does not include any trademark or service mark attributes that would, to a reasonable person, suggest a source, in the real world, of the type of good or service the generic element may represent. For instance, the generic element may be a can of beans that includes a label that that designates that the can contains beans, but does not connote any particular source of the beans, such as Del Monte or that the beans were grown in Iowa. For another example, the design element may be a cowboy character that is not affiliated with any particular state or television or cinematic work. For another example, the design element may be an audio clip that is not identifiable as having any particular source. Or, still further, the design element may be a pair of jeans that, again, are not identifiable as having originated from a particular producer of jeans.

Also, as used herein, the term "branded element" means a game design element that represents or includes a branded product or service offering. A branded offering carries or embodies a designation of source of the offering, such as a trademark or service mark in the form of a word, symbol, phrase, slogan, jingle, logo, sound or other designation of source. A branded offering may also embody a designation of source by way of a product configuration, such as the shape of a container holding a product. According to another example embodiment, the placement may be a trademark, logo, other visual element, phrase, tactile sensation such as a vibration, or a musical or other audio element, such as a product jingle or chime.

As used herein the term "gaming systems" includes all types of gambling devices such as, but not limited to, table games, displays, slot machines, video poker gambling machines, video lottery terminals, gaming devices, Internet or network gaming systems or devices, interactive or in-room TV gaming, or bingo or Keno systems or devices. Further, the product or service placement extends to any type of displays associated with gaming systems, for example cabinet mounted displays, or displays generated on an in-room TV or computer monitor, or displays presented on a display mounted external to a gaming device or devices. For instance, two or more gaming systems linked to an overhead plasma/LCD screen.

According to at least one example embodiment, the inventive subject matter described herein provides methods and apparatuses for the product or service offerings in gaming system designs by casino game manufacturers, directly or through their agents, wherein such is paid for by the entity promoting the offering. In various embodiments, the payment may take the form of money, but in other embodiments the payment is a bargained for exchange of consideration, compensation, or other agreement for placement of the product or service offerings. According to one example embodiment, such placement is achieved by substituting a branded product or service offering, for an otherwise generic element of a game, such that the branded element appears in the context of the game design as a substitute for what could otherwise be represented by a generic element without affecting the play characteristics of the game or diminishing the motivation of players to play the game. Such substitution requires, in one embodiment, authorization from the owner of the copyright in the game. This use of a branded element in place of what may otherwise be represented by a generic element promotes is termed herein as "context placement."

According to another example embodiment, the placement occurs outside of the context of the game design, such that advertising for a particular offering does not take place within the context of the game design, but rather is conceptually separate in presentation. For example, such a separate advertisement may comprise an advertisement run as a "spot" appearing during play of the game but not appearing to be part of the game design. Or, the advertisement may be presented in a "billboard" space sold to an advertiser. Such space may be an area on the cabinet or top box, or on a related screen display. Alternatively, the spot may appear in an area of a display used to present the game itself. This type of placement is termed herein as "non-context placement."

According to yet another example embodiment, the placement occurs as a substitution of a branded product or service offering for a generic element. Such a placement in one embodiment occurs in the context of a game design, but not to any particular theme or game. For example, in a game allowing players a certain amount of time, or other timed portion of a game, a time display is replaced by a particular brand of watch or other time keeping device. Another embodiment includes displaying the results of a portion of a game in a snapshot from a branded camera. A further embodiment includes displaying game results, or other game information on a branded display. In some embodiments, the branded display is a representation of a display of a piece of exercise equipment or an automobile dashboard. Yet a further embodiment includes a display on a representation of a score board, such as a representation of an identifiable score board of a professional sports team.

Figure 1:
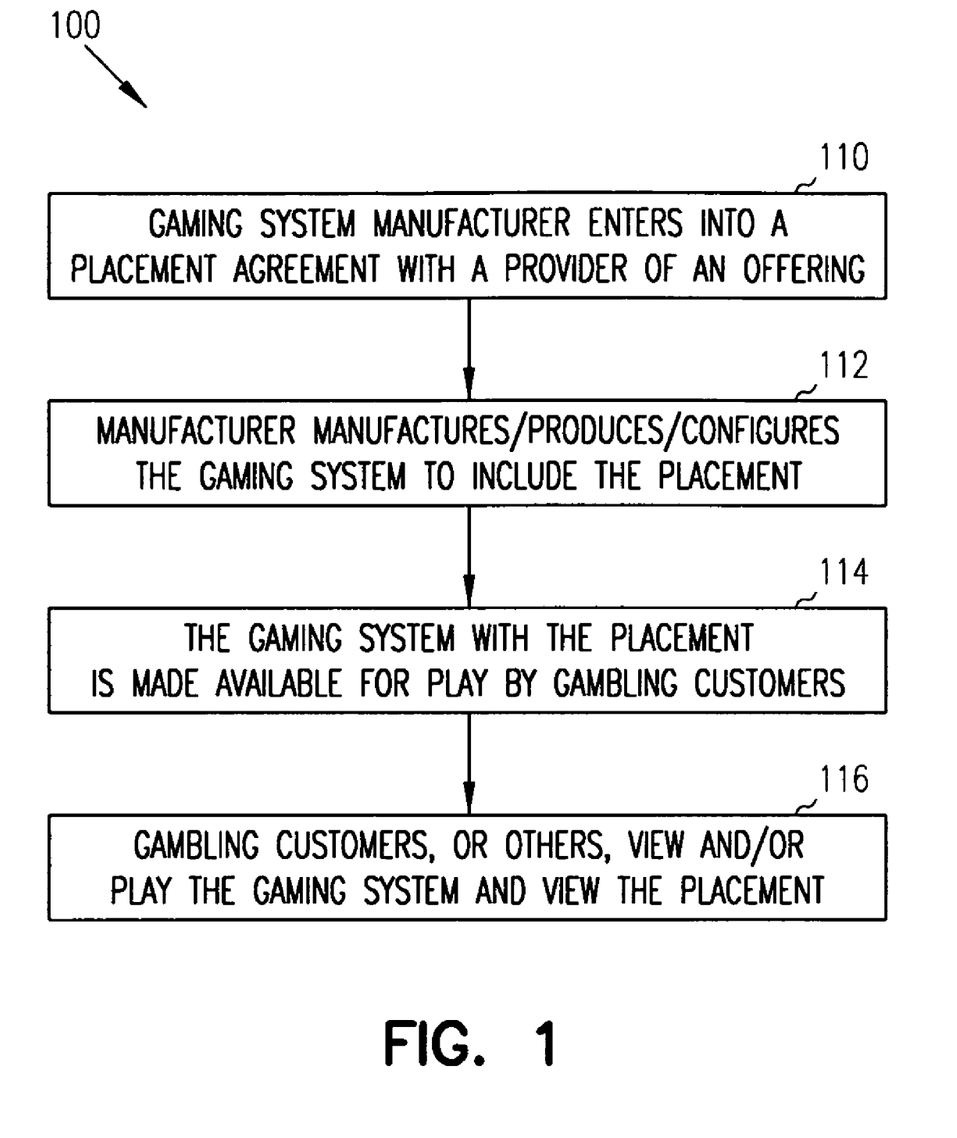
FIG. 1 illustrates a first product or service placement method according to one example embodiment of the inventive subject matter described herein.

FIG. 1 illustrates a first product or service placement method 100 according to one example embodiment of the inventive subject matter described herein. The example embodiment of FIG. 1 includes a gaming system manufacturer, directly or through an agent, entering into a placement agreement with a provider of an offering, such as a product or service, illustrated as block 110, wherein the agreement calls for the provider to pay for the placement in the game of a branded element. Such payment may be direct to the manufacturer, or indirect to an agent, or other third-party, of the manufacturer. An example of an indirect payment would be the manufacturer receiving payments from a distribution party that has been authorized by the manufacturer to sell rights for the manufacturer. Further, pay in this context includes other consideration such as a licensing or cross-licensing agreement, or virtually any other bargained for exchange of promises or compensation. The manufacturer manufactures or otherwise produces or configures the gaming system to include a placement of an offering, as illustrated in block 112. For example, this may be either a context or a non-context placement. The gaming system with the placement is made available for play by gambling customers, as illustrated by block 114. Gambling customers or others in turn view and/or play the gaming system and view the placement of an offering, as illustrated at block 116. The placement may be accomplished in a static fashion, for example one-time at manufacture, or in a dynamic fashion, using software control over, for instance, a network. According to another example embodiment, the method provides for dynamically introducing the offering placement into the gaming system such as by dynamically programming the machine to display or play the placement at a desired time, for example at a particular time of year that coincides with a seasonal product for instance, or at a particular time of day that coincides with the time of day an offering or message may be most desirable to present. For instance, a placement for a dinner show offering may be best presented in late afternoon, while advertisements for a sports event would coincide with the appropriate season. Another example includes dynamically causing the placement to be perceived upon the occurrence of a game event, a user initiated action, a time of day or date, or other event.

According to one example embodiment, a placement can be anywhere on the gaming system such as the display, cabinet, glass, buttons, bill validator, coin acceptor, card reader, ticket dispenser/acceptor, and can take any form such as visual, audio, tactile, or smell, and can be triggered by any trigger such as game play, button press, bill insert/dispense, card insert/dispense, coin insert/dispense, or others. The placement can be incorporated into the game as a single reel symbol, for instance a soft drink advertising symbol such as a brand name of a soft drink. Other embodiments include placements of other beverages such as alcoholic beverages, energy/sports drinks, water, and others.

Figure 2:
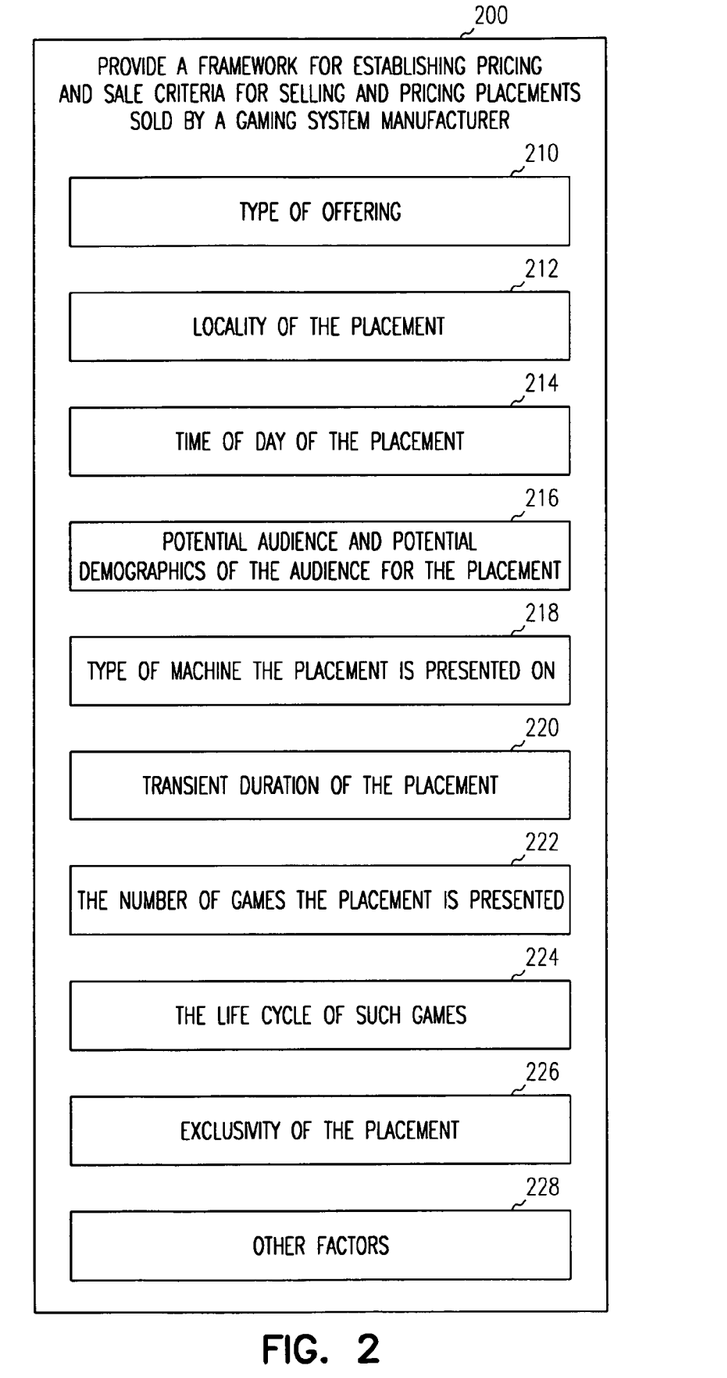
FIG. 2 illustrates terms and pricing according to one example embodiment of the inventive subject matter described herein.

FIG. 2 illustrates terms and pricing according to one example embodiment of the inventive subject matter described herein. According the example embodiment of FIG. 2, there is provided a framework 200 for establishing pricing and sales criteria for selling and pricing the placements sold by a gaming system manufacturer. Such criteria include, as illustrated, criteria based on type of offering 210, locality of the placement 212, time of day of the placement 214, the potential audience and potential demographics of the audience for the placement 216, the type of machine the placement is presented on 218, and the transient duration of the placement 220, such as how long the placement appears during a phase of the game, such as the splash page or during a bonus round. In some embodiments, the criteria further includes the number of games the placement is presented in 222, the life cycle of such games 224, the exclusivity of the placement 226, and other factors 228. According to another example embodiment, other factors on which to price the placement fees include the volume of machines expected or placed in the field or in use, as well as how often the placement will be visible when the game is idle and not being played. This latter factor may be more applicable when the placement is placed on the reels of a slot machine than when placed in a bonus round, which is less likely to be viewed when the game is idle unless, for instance, a preview is shown in an attract or demonstration mode of operation.

Figure 3:
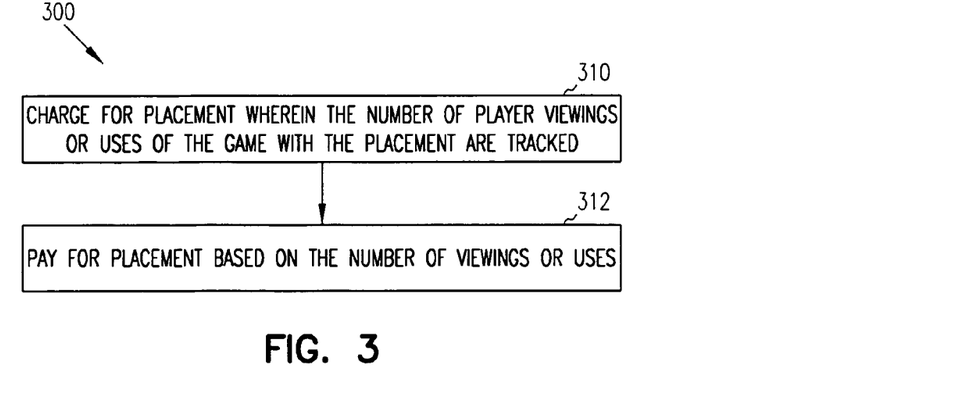
FIG. 3 illustrates a method for placing and for determining the invoicing and charges for product placement according to one example embodiment of the inventive subject matter described herein.

FIG. 3 illustrates a method for placing and determining the invoicing and charges for product placement according to one example embodiment of the inventive subject matter described herein. According the example embodiment FIG. 3, there is provided a method 300 for charging for placement wherein the number of player viewings or uses of the game with the placement are tracked, as indicated in block 310, and the placement is paid for based on the number of viewings or uses, as indicated in block 312. Such payments may also be dependent on the demographics of the viewers or users of the machine in which the placement is made, or based on any of the other factors enumerated with respect to FIG. 2, or any other criteria. Such demographics may be determined by a player identification card or other systems for identifying a specific player or profile of a type of player using a game. According to another example embodiment, a party placing an offering can pay the manufacturer based on amount of time their ads are in front of a player or other viewer. Such payments include virtually any type of payment or bargained for exchange. In some embodiments, the placement does not involve an exchange of money, but instead an exchange of other value such as a cross licensing agreement.

Figure 4:
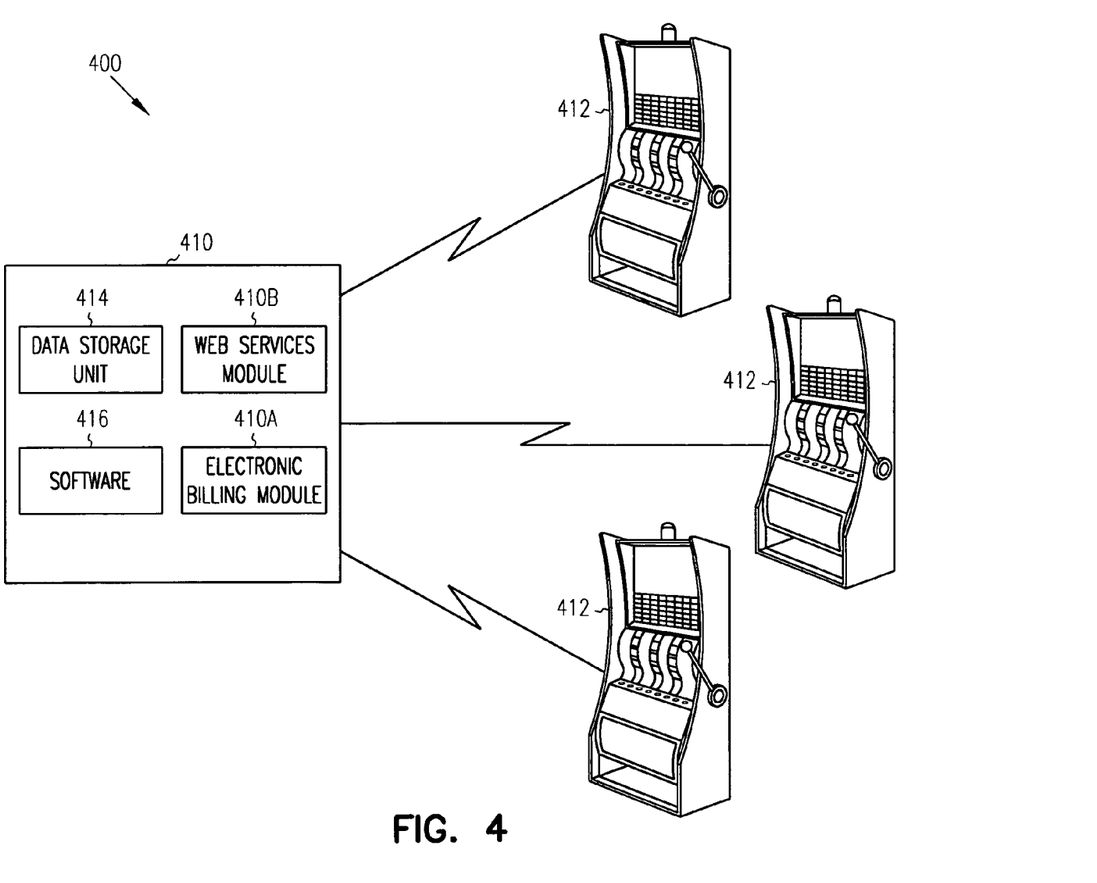
FIG. 4 illustrates a system for product or service placement according to one example embodiment of the inventive subject matter described herein.

FIG. 4 illustrates a system for product or service placement according to one example embodiment of the inventive subject matter described herein. According to the example embodiment of FIG. 4, there is provided a software system 400 including a server 410 optionally connected to a plurality of casino gaming systems 412. Server 410 includes a data storage unit 414 and software 416. Software 416 includes one or more programs for recording agreement information and using that information for determining charges to be assessed to parties making product placements. Server 410 further includes one or more programs for communicating with the casino slot machines or other gaming systems 412 in order to send or receive instructions or data. Server 410 may store, for instance, placement images or audios or other digital data containing a product placement, and such data may be sent to one or more of the casino gaming systems 412. Casino gaming systems 412 may include one or more programs for communicating with the server 410 in order to report the number of users or plays of a particular slot machine including a product placement, or to receive instructions and data in order to dynamically present placement information under the control and direction of the server 410. Alternatively, server 410 may receive use or user demographic data from a different system also connected to the gaming systems 412, such as an existing game management system.

According to another example embodiment, the game can also come from the central server 410 or another central server. In some such embodiments including a server 410, there are multiple central servers. Some central servers manage distribution of product placements across a group of gaming machines. Management of product placement distribution includes distributing placements to individual gaming machines based on various factors. Some such factors include a player identity derived from a card swiped on a card reader, or other player identification device such as a radio frequency identification device (RFID).

Server 410 in addition may include one or more programs for determining charges to be assessed for product placement, and invoicing the entity making the placement for payment back to the manufacturer. Server 410 includes an electronic billing module 410a that provides for presenting an electronic invoice to a party paying for a placement.

Further, according to another example embodiment, server 410 includes a web services module 410b that allows parties paying for offering placements to log on and view reports or report data on placements, such as the number of times a dynamic placement has been displayed or viewed by users of the gaming systems, the dates or date ranges such has occurred, demographic information on what types or profiles of players are being presented with the placements, or any other data that is known to or collected in the server 410.

Figure 5:
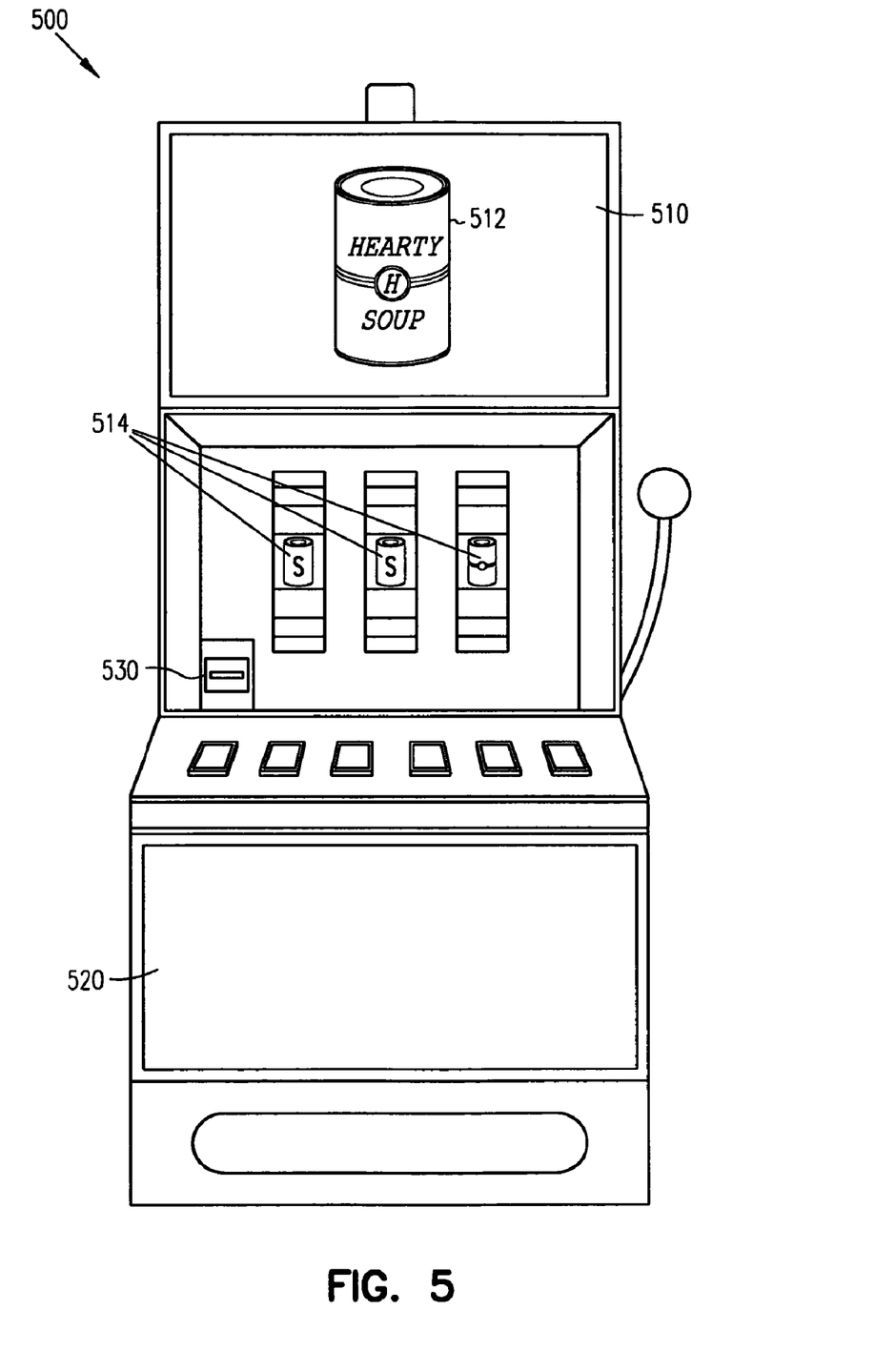
FIG. 5 illustrates a gaming system including product or service placement according to one example embodiment of the inventive subject matter described herein.

Thus, the placement of the inventive subject matter disclosed herein may provide the following features or benefits under certain circumstances:
  Slot machine/casino game medium reaches millions of new eyeballs within targeted demographics
  The number of impressions that a patron can view per sitting is higher than in movies/TV shows
  Captive audience and more accurately measurable audience for long and uninterrupted periods of time
  Reaches vast audiences via ever expanding global distribution channels (i.e., interactive television, mobile gaming, internet gaming) for casino games
  Reaches audiences at times when they are very attentive (positive experiences during winning spins or bonus rounds)
  Build national/international recognition for products (get people talking about products) and help/support advertisers launch new products/product lines
  Deliver powerful, yet subtle impressions if implemented in a way that does not interrupt the flow of the game and is therefore less obtrusive than other forms of advertising
  The actual life of a placement can be longer than in traditional mediums (unlike a TV commercial which appears only during a particular program and then vanishes unless another fee is paid, placement is embedded within the game and travels with it as long as it remains on floors)
  Full control of content channel enables delivery of exact message in a desired form
  Less expensive advertising medium, particularly compared to the over $100,000 cost of placing a single spot ad in prime time (and the corresponding CPMs of $13 (men 21+) and $19 (women 21+))
  Viewers cannot skip product ads using digital video recorders and are unlikely to leave the game in the middle FIG. 5 illustrates a gaming system including product or service placement according to one example embodiment of the inventive subject matter described herein. According to the example embodiment illustrated in FIG. 5 there is shown an example gaming system 500 (in this example more particularly referred to as a slot machine) featuring one example of a product placement. Gaming system 500 may be a freestanding machine or a tabletop machine of the mechanical or electronic video variety. The top fascia 510 of the machine 500 may include space for an advertising message or logo 512. Small logos in the exact aspect ratio and image of the jackpot and/or pay off symbols 514 are also shown. In the embodiment illustrated, the pay off symbols 514 include soup cans. The soup cans include generic soup cans depicted by the letter "S" and a branded soup can depicted by the striping of logo 512.

Such symbols 514 may appear in pay-off tables. Controls of the machine 500, such as touch screens, knobs, or pull handles, may also be used to present logos or other product placements. The bottom fascia 520 also offers a large advertising space. In addition, where an LCD or other type of display is used instead of or in addition to keypads and other mechanical/electrical buttons on gaming systems, the LCD or other display is a candidate location for product placement. In some embodiments, there is a location on a menu of a display of a game used for product placement. Selection of such a menu item causes information related to the subject of the placement to be displayed to a player. According to one example embodiment of the machine 500, there is provided a card slot 530. The card slot 530 is used by players who are casino members, such that a card, which is machine-readable, allows the machine to collect information via the card slot 530. For example, player demographics or preferences can be collected using the card slot 530.

According to one example embodiment, if the placement is audio, it can be generated automatically by the game play or alternatively, by player initiation or action. In one example embodiment, for instance, a party could pay, exchange services, license, cross license, or otherwise enter into an agreement with a gaming system manufacturer to have its slot machines play the recognizable THX audio signature when a player inserts a $100 bill into the bill validator of a slot machine. In another embodiment, the placement may be an audio that is unrelated to the specific game but relevant to create awareness that the gaming system uses a particular technology inside such as a chip from a semiconductor manufacturer, software from a software company, a sound system from a particular sound system manufacturer, or a graphics chip or board from a particular company.

Placement advertising may occur in content on an overhead plasma/LCD display, and be considered part of a gaming system, as long as it is under the control of a gaming device (even though it is itself not a gaming device). Thus, placement in a gaming system may take the form of products placed in auxiliary displays or auxiliary equipment, such as a seat associated with a gaming system. Such an auxiliary display may not even be under the control of the gaming device, but only associated with the gaming device, such as being mounted in or on a cabinet or other part of the gaming device, for example a LCD display on a slot machine chair.

Figure 6:
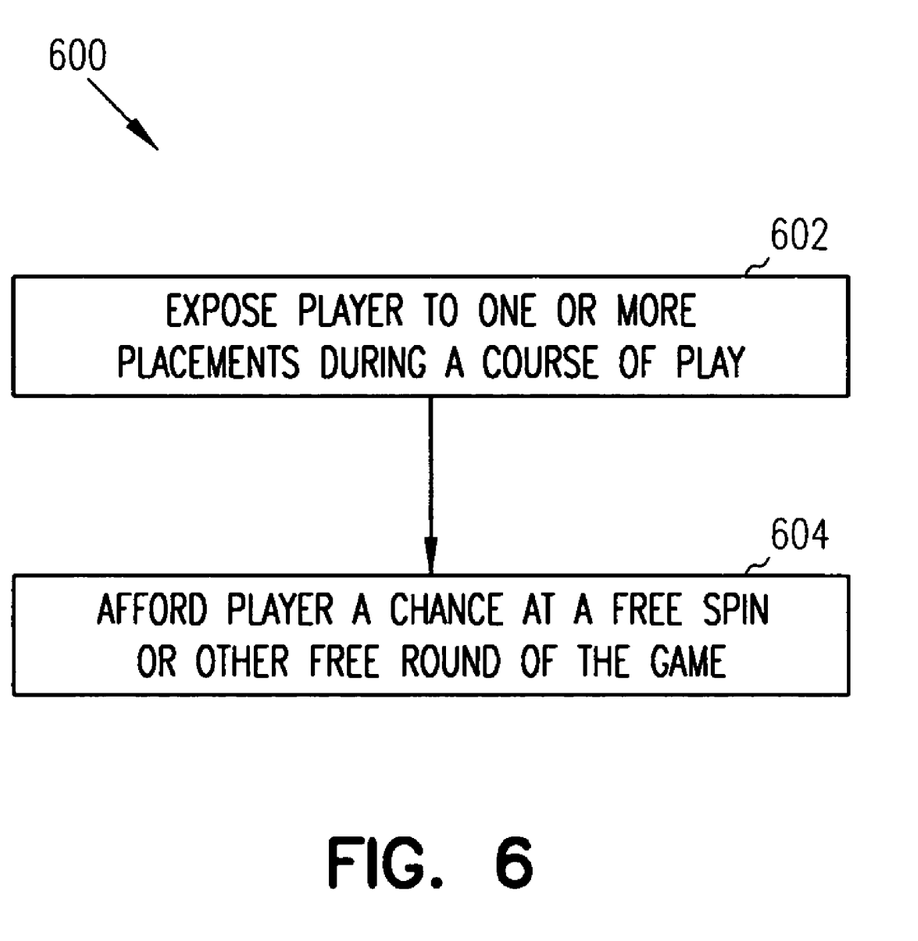
FIG. 6 illustrates a method including a product or service placement wherein a player is rewarded for, in one embodiment, viewing a placement.

FIG. 6 illustrates a method 600 including a product or service placement wherein a player is rewarded for, in one embodiment, viewing a placement. According to method 600, a player plays a gaming system and is exposed to one or more offering placements during the course of play, either randomly or by design 602. After the player views an offering placement one or more times, the player is afforded a chance at a free spin or other free round of the game 604, or can be afforded some other benefit. The party paying for the placement could pay for such a player reward. According to another example embodiment, the reward is granted once the player has viewed one or more advertisements dynamically presented in the game display, wherein the advertisements are not necessarily offering placements. The number of times that the placement or advertising has to be viewed prior to a reward being granted to a player may be fixed or may be random in number or may be dynamically determined. According to these example embodiments, the player receives a positive reward in association with a particular placement or advertising, and thus there is potentially a greater likelihood the player will remember the placement or advertising. Thus, such a placement or advertising may cost more.

According to still another embodiment, a gaming system according to the invention may take the form of a stand-alone device having its own cabinet, or it may be deployed on a workstation or personal computer such as an Apple™ brand computer or a PC-compatible computer. Further, the gaming system may operate in a stand-alone mode, or it may be operated over or on a network, or may operate by itself or in conjunction or cooperation with other gaming systems, such as in a competitive gaming or progressive gaming environment. In any event, the type of gaming system the inventive subject matter is implemented on is not important and may be any type of system now in use or later developed.

One other embodiment includes an incentive to players for choosing to watch an advertisement. For example, the player can choose to play a game without advertising. In another embodiment, the player can be offered an extra bonus if the player chooses to enable the ads, such as extra paylines or other features. For some embodiments, the extra bonus is subsidized from part of the money paid by the advertiser. For example, assuming a penny game: The advertiser agrees to pay $0.50 for each time its ad is shown. A first portion (e.g. 15 cents) goes toward giving the player 3 extra paylines for five spins. A second portion (e.g. 20 cents) goes to the casino and a third portion (e.g. 15 cents) goes to the gaming machine manufacturer.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of this inventive subject matter may be made without departing from the principles and scope of the inventive subject matter as expressed in the subjoined claims.

What is claimed is:

1. A method comprising:
producing a gaming system by a producer that is based on a game design, wherein the game design includes a plurality of design elements and at least some of the design elements are generic elements of a particular type;
offering to place a product or service on a gaming system on which the game design is used, wherein the offer is to use a branded element in place of a selected one of the generic elements of the game design, and further wherein the offer is made on behalf of the producer of the gaming system;
dynamically placing a branded element in place of the selected one of the generic elements during operation of the gaming system, wherein the branded element is of the same type as the generic element; and
compensating the producer of the gaming system for the placement of the branded element in the gaming system.

2. A method according to claim 1 wherein the generic element comprises a consumer product.

3. A method according to claim 1 further wherein the producer of the gaming system is a manufacturer of the gaming system.

4. A method according to claim 1 further including the producer of the gaming system authorizing distribution of the gaming system to a customer.

5. A method according to claim 1 wherein the offer is made by an employee of the producer.

6. A method according to claim 1 wherein the offer is made by an agent of the producer.

7. A method according to claim 1 further wherein the game design includes one or more elements selected from the group of: visual, audio, tactile, thematic, plot, character, behavioral, or object elements.

8. A method according to claim 1 further wherein the game design includes a theme for the entire game, or for a sub-part of the game.

9. A method according to claim 8 wherein the theme is derived from one of the group of a television show, a movie, a comic book story, or a board game.

10. A method according to claim 1 further wherein the game design includes a plot element including a plot line that runs through all or part of the game design.

11. A method according to claim 1 further wherein the game design includes a plot with a character.

12. A method according to claim 11 further wherein the character uses a product or service that is depicted with a branded element.

13. A method according to claim 1 further wherein the game design includes a branded element that is used on a cabinet for the gaming system.

14. A method according to claim 1 further wherein the game design includes an attract mode.

15. A method according to claim 1 further wherein the game design includes a play sequence involving a plurality of generic elements.

16. A method comprising:
producing a gaming system by a producer that is based on a game design;
offering to place a product or service on a gaming system on which the game is played, wherein the offer is to place an advertisement in the game or on the gaming system, wherein the offer is made on behalf of the producer;
dynamically placing an advertisement in the game or on the gaming system during operation of the gaming system;
compensating the producer of the gaming system for the placement of the advertisement; and
offering a player of the game a reward in the game if the advertisement is displayed to the player one or more times during the play of the game.

17. A method according to claim 16 wherein the reward includes an extra feature in the game.

18. A method according to claim 16 wherein the reward is subsidized by the party that compensates the producer of the gaming system for the placement of the advertisement.

19. A method comprising:
providing a game on a gaming system operating in a gaming establishment, the game including one or more generic elements;
dynamically substituting a branded element for a selected one of the generic elements of the game, the branded element serving to advertise a product or service of a third party; and
compensating a provider of the game or the gaming system for the substituting.

20. A method according to claim 19 wherein the third party performs the compensating.

21. A method according to claim 19 further including rewarding a player of the game with a reward in the game for viewing the branded element one or more times during play of the game.

22. A method according to claim 21 wherein the reward is subsidized by the third party.

23. A method according to claim 21 wherein the rewarding occurs in response to the player viewing the branded element a fixed or random number of times during play of the game.

24. A method comprising:
providing a game on a gaming system operating in a gaming establishment, the game including an optional advertisement such that the game can be played with or without the advertisement, the advertisement serving to advertise a product or service of a third party;
allowing a player to choose to play the game with or without the advertisement;
rewarding the player with a reward in the game, in response to the player choosing to play the game with the advertisement; and
compensating a provider of the game for placing the advertisement.

25. A method according to claim 24 wherein the third party performs the compensating.

26. A method according to claim 24 wherein the reward is subsidized by the third party.

* * * * *

UNITED STATES PATENT AND TRADEMARK OFFICE
CERTIFICATE OF CORRECTION

PATENT NO. : 8,209,221 B2  
APPLICATION NO. : 11/176794  
DATED : June 26, 2012  
INVENTOR(S) : Schwartz et al.

Page 1 of 1

It is certified that error appears in the above-identified patent and that said Letters Patent is hereby corrected as shown below:

In column 11, line 5, in Claim 9, after "of", insert --:--, therefor.

Signed and Sealed this
Second Day of October, 2012

David J. Kappos
*Director of the United States Patent and Trademark Office*